United States Patent [19]

Ionescu et al.

[11] Patent Number: 4,697,570
[45] Date of Patent: Oct. 6, 1987

[54] ELECTRONIC IGNITION CIRCUIT WITH AUTOMATIC CONTROL ADVANCE

[75] Inventors: Dragos Ionescu, New York; Mihai Soiman, Elmhurst, both of N.Y.

[73] Assignee: Wedtech Corp., New York, N.Y.

[21] Appl. No.: 867,334

[22] Filed: May 23, 1986

Related U.S. Application Data

[63] Continuation-in-part of Ser. No. 704,011, Feb. 21, 1985, Pat. No. 4,610,237.

[51] Int. Cl.$^4$ .............................. F02P 3/08; F02P 5/04
[52] U.S. Cl. ..................................... 123/602; 123/418; 123/600
[58] Field of Search ............ 123/599, 602, 418, 149 C, 123/600

[56] References Cited

U.S. PATENT DOCUMENTS

| | | | |
|---|---|---|---|
| 3,504,658 | 4/1970 | Chavis | 123/605 X |
| 3,747,582 | 7/1973 | Kato | 123/599 |
| 3,861,372 | 1/1975 | Shibukawa et al. | 123/602 |
| 3,863,616 | 2/1975 | Wood | 123/602 X |
| 3,941,110 | 3/1976 | Sekiguchi | 123/599 |
| 3,952,715 | 4/1976 | Van Siclen, Jr. | 123/602 |
| 4,132,208 | 1/1979 | Yukawa | 123/602 |
| 4,335,692 | 6/1982 | Miura | 123/418 |
| 4,342,304 | 8/1982 | Watanake | 123/149 R X |
| 4,566,425 | 1/1986 | Nitou et al. | 123/602 X |
| 4,610,237 | 9/1986 | Ionescu et al | 123/600 |

Primary Examiner—Tony M. Argenbright
Attorney, Agent, or Firm—Karl F. Ross; Herbert Dubno

[57] ABSTRACT

An electronic ignition system for a magneto-operated internal combustion engine eliminates Zener diodes as nonlinear elements for control of the advance and employs a unilateral switch utilizing a diode feedback element to provide a logarithmic response for controlling a SCR which is thereby triggered into conduction to discharge a capacitor and fire a sparkplug.

9 Claims, 3 Drawing Figures

ELECTRONIC IGNITION CIRCUIT WITH AUTOMATIC CONTROL ADVANCE

CROSS REFERENCE TO RELATED APPLICATION

This application is a continuation-in-part of our copending application Ser. No. 704,011 filed Feb. 21, 1985 and commonly assigned herewith, now U.S. Pat. No. 4,610,237.

FIELD OF THE INVENTION

Our present invention relates to an ignition circuit for magneto-triggered internal combustion engines of the type in which a low voltage winding responds to the rotating magnetic field of the magneto, which is coupled to the engine shaft, and ultimately generates a high voltage pulse which is applied to a spark plug or a number of such pulses which are applied to a number of spark-plugs to fire the latter with proper timing to drive engine.

BACKGROUND OF THE INVENTION

As was pointed out in the aforementioned copending application, small internal combustion engines can comprise a magneto for generating the pulse or pulses which trigger ignition in those cylinders in which compression of the fuel-air mixture has occurred.

In early designs of such engines, the electrical pulse generated by the magneto, i.e. the magnet/coil or winding assembly, which were relatively rotated by the shaft of the engine, fired the sparkplugs in appropriate order, the voltage level of the pulse being increased by the action of breaker points and a voltage multiplying coil or high voltage transformer or so-called spark coil. Firing control or proper timing of the "advance" was effected by mechanical factors such as the offsetting of various parts of the system with respect to one another.

The "advance" of the spark required for increased speed was effected by mechanically moving the element of the triggering system in such cases.

These systems eliminate the need for a battery or other source of electrical energy and hence use of magneto engines have found widespread application where such batteries and battery-charging systems are inconvenient, namely, for small engines, with outputs below, say, 100 hp, and in a wide variety of assemblies and for various uses.

In recent years, efforts have been made to develop electronic ignition systems utilizing magneto-controlled firing, substituting electronic switching to eliminate the breaker points which have caused reliability problems, especially for military and government applications where the engines must conform to extremely rigid performance specifications.

Such electronic ignition systems include those of the references in the file of the aforementioned copending application of which U.S. Pat. No. 3,941,110 is of particular interest.

In that system, the magneto winding is separate from the high voltage coil and the firing is controlled by triggering the discharge of a condenser or capacitor through the high voltage coil using a SCR as a switching element, the capacitor being charged through a rectifier. To the gate of this SCR, a transistor timing circuit with a Zener diode or a Zener diode timing circuit is provided.

In that system it is pointed out that the Zener diode eliminates automatic advance inherent in earlier SCR triggered circuits with temperature, and therefore allows the wave form in the magneto winding to be employed to trigger the SCR.

Mention may also be made of U.S. Pat. No. 4,342,304 in which a programmable unijunction transistor is employed to control the pulse through the high voltage transformer, although here no magneto arrangement is provided. Another electrical advance device for ignition timing is found in U.S. Pat. No. 3,861,372 in which, however, a separate winding is provided for the electronic circuitry controlling the advance.

Thus, while it is clear that electronic ignition systems have been developed in the past, there are still problems which were not resolved by them. In general, it can be said that in the past the electronic ignition systems which were practically available were not very reliable due to the fact of their complexity with many discrete components active and passive, relying on their parameter dispersion as evidenced by the fact that, upon the purchase of a large number of self-contained electronic ignition control systems, even when they were purported to comply with government and military specifications, it was found that a substantial proportion did not perform up to these standards, were inoperative and required replacement.

The circuits described in the above-mentioned copending application were designed to overcome these drawbacks and provide a highly efficient automatic advance control circuit which was not only simple but reliable.

In that system, the nonlinear network connected to the magneto winding and logarithmically responsive to a signal generated therein for triggering the control electrode of the SCR to discharge the condenser through the high voltage transformer to fire the spark plug provided automatic advance and retardation of the firing point depending upon the logarithmic response of the nonlinear network:

In an essential embodiment, that network consisted of:

a blocking diode connected to the magneto winding at one side of the blocking diode;

a transducer having a base connected to another side of the blocking diode and also having two principal electrodes;

a series network of a Zener diode and a resistor interposed between the aforementioned other side of the blocking diode and the base of the transistor and across the base and one of the principal electrode (emitter or collector) of the transistor; and means including a load resistor in series with the other principal electrode for directly tapping a signal across this resistor and applying it directly to the gate or control electrode of the SCR to trigger the switch formed thereby.

This system was found to be highly reliable in practice as a self-contained unit and devoid of the drawbacks of earlier systems.

OBJECTS OF THE INVENTION

It is the principal object of the present invention to extend the principles of our earlier application.

Another object of this invention is to provide an improved ignition system for small internal combustion engines and particularly magneto-operated engines of the type described.

Yet another object of our invention is to provide an electronic ignition system which eliminates entirely the triggering coils heretofore required in magneto systems for the actual firing of the discharges at the sparkplugs and the breaker points associated therewith.

A further object of the invention is to improve upon the advance control of electronic ignition systems for the purposes described.

SUMMARY OF THE INVENTION

We have now found that very significant gains in operational reliability and simplicity in low cost ignition circuit for magneto-operated small internal combustion engines can be obtained by the use of a comparatively new electronic circuit element, namely, the unilateral switch which can be incorporated in a highly advanced nonlinear network providing logarithmic control of the firing point of a SCR in response to the shift in the configuration or orientation of the voltage rise curve generated in the magneto winding so as to automatically regulate the advance of the firing.

According to another feature of the invention, this nonlinear network is provided with an input from a transducer responsive to intake manifold pressure so that changes in the "advance" of the firing point can be fine-tuned in response to the intake manifold pressure.

According to the invention, therefore, an electronic ignition system for an internal combustion engine having at least one sparkplug and a magneto having at least one magneto coil with a low voltage winding can comprise:

a charging circuit connected at the winding and providing a rectified output;

a discharge condenser connected to the charging circuit and adapted to be charged by the output;

a triggering circuit including an electronic switch having a control electrode and a high voltage transformer connected by the switch to the condenser and provided with means for connecting the transformer to the sparkplug; and a nonlinear network connected to the winding and responsive to a signal generated therein for triggering the electrode to effect a discharge of the condenser through the transformer to fire the sparkplug, the active nonlinear network including an electronic switching element in circuit with the electrode and the coil, and a logarithmic circuit element in a feedback path between a gate and a principal electrode of the electronic switching element for shifting the firing point of the sparkplug with changes in speed of the engine based upon changes in the configuration of the charging curve of the capacitor with frequency changes in the winding resulting from engine speed changes.

More particularly, the charging circuit can include a series network of a diode and a resistor for limiting peak voltage from the winding, to automatically control the firing of the sparkplug with a small advance angle at low engine speeds and provide a controlled retardation at higher engine speeds to avoid overspeed when engine is unloaded.

Preferably, as noted, the electronic switch element is a unilateral switch and the logarithmic circuit element is a diode. A bilaterial switch member can be used in the form of triacs for alternate firing on both positive and negative charging pulses. An asymmetrical device ASBS can also be used.

BRIEF DESCRIPTION OF THE DRAWING

The above and other objects, features and advantages of the present invention will become more readily apparent from the following description, reference being made to the accompanying drawing, in which.

SPECIFIC DESCRIPTION

Figure 1:
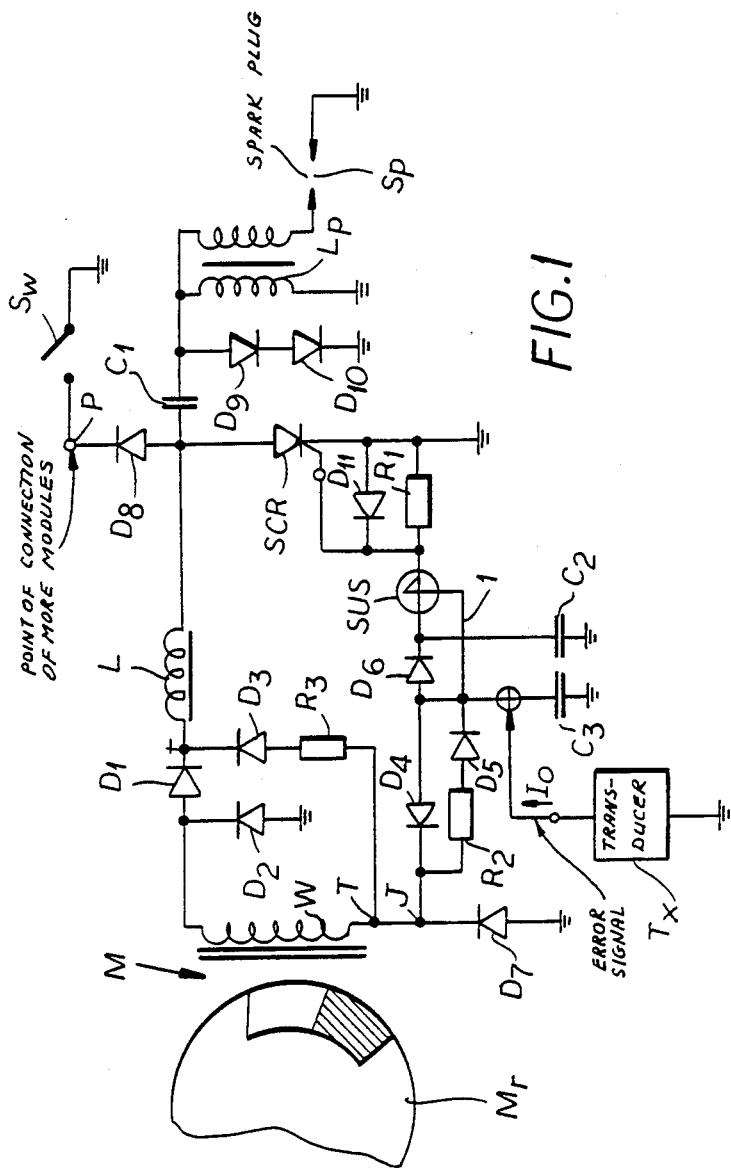
FIG. 1 is a circuit diagram of an electronic ignition system according to the invention.

From FIG. 1 it can be seen that the electronic ignition system for a magneto engine according to the invention comprises a magnito M having a rotating magnet $M_r$ which can be coupled to the shaft of the engine which cooperates with the magneto winding W to generate a sinosoidal waveform rectified by the diodes $D_1$, $D_2$ and $D_7$ to apply to a capacitor $C_1$ through the inductor L, a charging current.

Figure 2:
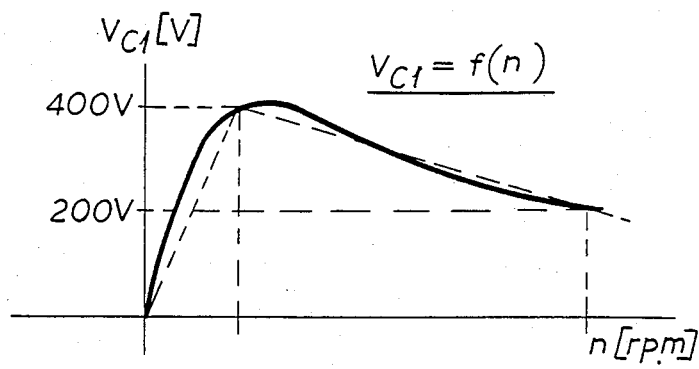
FIGS. 2 and 3 are graphs respectively of capacitor voltage versus frequency and spark timing versus frequency (or rpm), illustrative of characteristics of the system.

Through the diode $D_8$ at a point P, two or more complete modules including firing circuits can be connected to a common or separate charging circuit (See FIG. 2 of the aforementioned copending application). A switch $S_w$ can connect this point to ground to stop the engine.

The capacitor is connected in series with the primary winding of a high voltage transformer $L_p$ whose secondary winding is in series with the spark plug $S_p$ and ground. Overvoltage breakdown diodes $D_9$ and $D_{10}$ shunt the primary winding of the high voltage transformer $L_p$, when $C_1$ reverses the polarity as a result of primary selfinductance, eliminating the cause for another reverse high voltage pulse to be generated in the secondary.

Between one terminal T of the winding W and ground, a diode $D_7$ is provided and to this junction J, a reversely poled diode $D_4$ is connected in series with the logarithmic circuit element in the form of a diode $D_6$ which is forwardly poled and has one side connected to the anode of the unilateral switch SUS. The cathode of the unilateral switch SUS is tied to a load resistor $R_1$ bridged by a diode $D_{11}$ and the gate of the solid state controlled rectifier SCR is tied to the junction of the resistor $R_1$ and the cathode of the unilateral switch SUS.

The principal electrodes of the SCR are connected between the capacitor and ground so that when the SCR is rendered conductive, current will flow through the high voltage transformer to generate the pulse.

A conductor 1 connects the gate of the unilateral switch SUS to the junction of the diodes $D_4$ and $D_6$ to complete the feedback path and a series network of a resistor $R_2$ and a diode $D_5$ is bridged across the diode $D_4$ and connected to the gate of the unilateral switch SUS. Capacitors $C_2$ and $C_3$ connect the opposite sides of the diode $D_6$ to ground and a transducer $T_x$ responsive to the intake manifold pressure generates an error signal in the form of a voltage which is supplied to the feedback at a location at which it can affect the gate of the unilateral switch.

Figure 3:
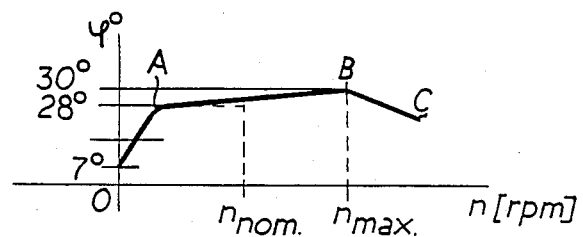

The function of the series network of resistor $R_3$ and diode $D_3$ which is connected across the winding W is best understood by reference to FIG. 3 in which the advance angle is plotted along the ordinate against the speed of the engine in RPM plotted against the abscissa.

Initially the circuit triggering delivers a small advance angle which ultimately is converted in a controlled retardation at high speed by limiting the peak amplitude (voltage) which is transmitted by the charging coil and is the function of the diode-resistor network $D_3$-$R_3$ which becomes effective in the range B-C in the diagram of FIG. 3.

The timing circuit illustrated responds to the shift in the curve of the voltage applied to the capacitor which generally has the form shown in FIG. 2 in which voltage across the capacitor is plotted along the ordinate against speed in RPM along the abscissa. The actual curve can have a linear approximation and because of the shift of this curve depending upon frequency, which in turn depends upon the engine's speed, the triggering circuit in effect utilizes the unilateral switch as an amplifier element with the diode $D_6$ in a feedback path to provide a logarithmic response and automatic compensation of the advance with speed.

The system operates with a significantly reduced number of components in a highly effective manner and thus is reliable under practically all operating conditions.

A further advantage is the ability to completely eliminate the Zener diode which has been found to limit performance and output of such ignition circuits. The small number of resistive elements and the thermal compensating effect of the diodes $D_4$, $D_5$ and $D_6$ connected as indicated to the unilateral switch SUS gate-anode junction minimizes thermal instability and provides extraordinary stability under a range of temperature conditions from $-50°$ F. to $180°$ F.

We claim:

1. An electronic ignition system for an internal combustion engine having at least one sparkplug and a magneto having at least one magneto coil having a low voltage winding, comprising:
   a charging circuit connected to said winding and providing a rectified output;
   a discharge condenser connected to said charging circuit and adapted to be charged by said output;
   a triggering circuit including an electronic switch having a control electrode and a high voltage transformer connected by said switch to said condenser and provided with means for connecting said transformer to said sparkplug; and
   a nonlinear network connected to said winding and responsive to a signal generated therein for triggering said electrode to effect a discharge of said condenser through said transformer to fire said sparkplug, said nonlinear network including an electronic switching element in circuit with said electrode and said coil, and a logarithmic circuit element in the form of at least one diode in a feedback path between a gate and a principal electrode of said electronic switching element for advancing the firing point of the sparkplug with an increase in speed of the engine based upon changes in the configuration of the charging curve of said capacitor with frequency changes in said winding resulting from engine speed changes.

2. An electronic ignition system for an internal combustion engine having at least one sparkplug and a magneto having at least one magneto coil having a low voltage winding, comprising:
   a charging circuit connected to said winding and providing a rectified output;
   a discharge condenser connected to said charging circuit and adapted to be charged by said output;
   a triggering circuit including an electronic switch having a control electrode and a high voltage transformer connected by said switch to said condenser and provided with means for connecting said transformer to said sparkplug; and
   a nonlinear network connected to said winding and responsive to a signal generated therein for triggering said electrode to effect a discharge of said condenser through said transformer to fire said sparkplug, said nonlinear network including an electronic switching element in circuit with said electrode and said coil, and a logarithmic circuit element in the form of at least one diode in a feedback path between a gate and a principal electrode of said electronic switching element for advancing the firing point of the sparkplug with an increase in speed of the engine based upon changes in the configuration of the charging curve of said capacitor with frequency changes in said winding resulting from engine speed changes said charging circuit including a series network of a diode and a resistor for limiting peak voltage from said winding to automatically control the firing of said sparkplug with a small advance angle at low engine speeds and provide a controlled retardation at higher engine speeds.

3. The electronic ignition system defined in claim 2 wherein said electronic switching element is a unilateral switch (SUS) or bilateral switch (SBS).

4. The electronic ignition system defined in claim 3 wherein said logarithmic circuit element is a diode in the feedback loop of said electronic switching element as seen as a current amplifier.

5. The electronic ignition system defined in claim 4 wherein electronic switching element is said unilateral switch and said unilateral switch as an anode and a cathode as principal electrodes, said nonlinear network further including:
   a rectifying diode connected between one terminal of said winding and ground;
   a reversely poled diode connected between the diode forming said logarithmic circuit element and said terminal;
   a series network of a resistor and another diode connected between said terminal and a junction between said reversely poled diode and the diode forming said logarithmic circuit element and to said gate, said diode forming said logarithmic circuit element being connected to said anode, said cathode being connected to ground across a resistor, said electronic switch being an SCR with its gate as said control electrode, said control electrode being connected between said cathode and the last-mentioned resistor; and
   respective capacitors connected between said gate of said unilateral switch and ground and between said anode of said unilateral switch and ground.

6. The electronic ignition system defined in claim 2, further comprising means responsive to intake manifold pressure of said engine and connected to said nonlinear network for varying the automatic advance established by said nonlinear network in accordance with said pressure for a higher order control function which will correlate timing with engine output power in order to improve power response.

7. An electronic ignition system for an internal combustion engine having at least one sparkplug and a magneto having at least one magneto coil having a low voltage winding, comprising:
   a charging circuit connected at said winding and providing a rectified output;
   a discharge condenser connected to said charging circuit and adapted to be charged by said output;
   a triggering circuit including an electronic switch having a control electrode and a high voltage transformer connected by said switch to said condenser and provided with means for connecting said transformer to said sparkplug; and
   a nonlinear network connected to said winding and responsive to a signal generated therein for triggering said electrode to effect a discharge of said condenser through said transformer to fire said sparkplug, said nonlinear network including a unilateral switch having a gate and also having an anode and a cathode as principal electrodes connected to said control electrode and to said coil, and a logarithmic circuit element in the form of a forwardly poled diode in a feedback path between said gate and said anode of said electronic switching element for shifting the firing point of the sparkplug with changes in speed of the engine based upon changes in the configuration of the charging curve of said capacitor with frequency changes in said winding resulting from engine speed changes.

8. The electronic ignition system defined in claim 7 wherein said nonlinear network further includes:
   a rectifying diode connected between one terminal of said winding and ground;
   a reversely poled diode connected between the diode forming said logarithmic circuit element and said terminal;
   a series network of a resistor and another diode connected between said terminal and a junction between said reversely poled diode and the diode forming said logarithmic circuit element and to said gate, said diode forming said logarithmic circuit element being connected to said anode, said cathode being connected to ground across a resistor, said electronic switch being an SCR with its gate as said control electrode, said control electrode being connected between said cathode and the last-mentioned resistor; and
   respective capacitors connected between said gate of said unilateral switch and ground and between said anode of said unilateral switch and ground.

9. The electronic ignition system defined in claim 7, further comprising means responsive to intake manifold pressure of said engine and connected to said nonlinear network for varying the automatic advance established by said nonlinear network in accordance with said pressure.

* * * * *